US012699561B2

(12) United States Patent
Sahoo

(10) Patent No.: US 12,699,561 B2
(45) Date of Patent: Aug. 4, 2026

(54) AI BASED VENDOR AND CUSTOMER AGNOSTIC FRAMEWORK TO IMPROVE INTEGRATION OF LEGACY SYSTEMS

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 19/007,310

(22) Filed: Dec. 31, 2024

(65) Prior Publication Data

US 2026/0186771 A1 Jul. 2, 2026

(51) Int. Cl.
| | |
|---|---|
| *G06F 8/70* | (2018.01) |
| *G06F 21/62* | (2013.01) |
| *G06F 40/205* | (2020.01) |
| *G06Q 10/087* | (2023.01) |
| *G06Q 30/0202* | (2023.01) |

(52) U.S. Cl.
CPC .............. *G06F 8/70* (2013.01); *G06F 21/62* (2013.01); *G06F 40/205* (2020.01); *G06Q 10/087* (2013.01); *G06Q 30/0202* (2013.01)

(58) Field of Classification Search
CPC .. G06F 8/70; G06F 8/40; G06F 8/205; G06Q 10/087; G06Q 30/0202
USPC .................. 717/120–140; 706/21–45, 25–45
See application file for complete search history.

(56) References Cited

U.S. PATENT DOCUMENTS

| | | | | | |
|---|---|---|---|---|---|
| 8,069,435 | B1 * | 11/2011 | Lai | .......................... | H04L 67/51 |
| | | | | | 717/106 |
| 8,091,065 | B2 * | 1/2012 | Mir | ........................ | G06Q 10/06 |
| | | | | | 726/22 |
| 8,127,278 | B2 * | 2/2012 | Bohle | ....................... | G06F 8/70 |
| | | | | | 717/134 |

(Continued)

FOREIGN PATENT DOCUMENTS

| | | |
|---|---|---|
| AU | 2024204660 A1 | 1/2025 |
| CA | 118297564 A | 7/2024 |

(Continued)

OTHER PUBLICATIONS

Wolfart et al, "Modernizing Legacy Systems with Microservices: A Roadmap", ACM, pp. 1-11 (Year: 2021).*

(Continued)

*Primary Examiner* — Anil Khatri

(74) *Attorney, Agent, or Firm* — Ice Miller LLP

(57) ABSTRACT

Systems and methods provide for integrating legacy systems into a unified platform. Embodiments include a system configured to ingest, normalize, and store data from multiple sources using a data layer, analyze and transform data using AI algorithms by a processing layer, and provide a dynamic user interface for data visualization and interaction by a presentation layer. Methods are provided for receiving, by a computing device, data such as email orders, vendor catalogs, CRM data, etc., extracting data from the content, processing the data using natural language processing techniques, analyzing the data using machine learning models, mapping the data to a unified platform's schema, managing (Continued)

the integration workflow using a workflow orchestration engine, providing real-time data insights, and resolving data errors or anomalies using an exception management system.

6 Claims, 7 Drawing Sheets

(56) References Cited

U.S. PATENT DOCUMENTS

| | | | |
|---|---|---|---|
| 8,237,792 B2* | 8/2012 | Uehara | G08B 13/19613 |
| | | | 707/741 |
| 8,311,863 B1 | 11/2012 | Kemp | |
| 8,443,036 B2* | 5/2013 | Li | G06F 16/252 |
| | | | 709/201 |
| 8,914,544 B2* | 12/2014 | Lalji | G06Q 10/06 |
| | | | 709/246 |
| 9,390,089 B2* | 7/2016 | Pitzo | G06F 16/2228 |
| 9,390,428 B2 | 7/2016 | Rehman et al. | |
| 10,078,843 B2 | 9/2018 | Dadia et al. | |
| 10,108,974 B1 | 10/2018 | Shariff et al. | |
| 11,120,038 B1* | 9/2021 | Ossher | G06F 16/2246 |
| 11,222,003 B1 | 1/2022 | Jones et al. | |
| 11,379,219 B2* | 7/2022 | Bhalla | G06Q 10/06313 |
| 11,770,304 B1 | 9/2023 | McNally | |
| 11,811,928 B2* | 11/2023 | Shaaban | H04L 63/0815 |
| 11,983,806 B1* | 5/2024 | Ramesh | G06T 11/00 |
| 12,014,375 B2* | 6/2024 | Brakob | G06Q 20/208 |
| 12,077,313 B1* | 9/2024 | Whaley | B64D 39/00 |
| 12,204,323 B1* | 1/2025 | Malviya | G05B 23/0216 |
| 12,271,491 B2* | 4/2025 | Cameron | G06F 21/552 |
| 12,333,412 B1* | 6/2025 | Mazed | G10L 15/18 |
| 12,346,702 B1* | 7/2025 | Burbine | G06F 9/44505 |
| D1,091,608 S | 9/2025 | Li et al. | |
| D1,101,762 S | 11/2025 | Gordonov et al. | |
| D1,102,464 S | 11/2025 | Varga et al. | |
| 12,474,936 B2 | 11/2025 | Dostie, Jr. et al. | |
| D1,110,338 S | 1/2026 | Goodrich et al. | |
| 12,537,998 B1 | 1/2026 | Perelli-Minetti et al. | |
| 2003/0009397 A1 | 1/2003 | Whitenack et al. | |
| 2007/0203798 A1 | 8/2007 | Caballero et al. | |
| 2008/0082426 A1 | 4/2008 | Gokturk et al. | |
| 2010/0145831 A1 | 6/2010 | Esfandiari et al. | |
| 2011/0313882 A1 | 12/2011 | Barthes | |
| 2012/0054642 A1 | 3/2012 | Balsiger et al. | |
| 2013/0018651 A1 | 1/2013 | Djordjevic et al. | |
| 2013/0246215 A1 | 9/2013 | Faith et al. | |
| 2013/0290234 A1 | 10/2013 | Harris et al. | |
| 2016/0196564 A1 | 7/2016 | Dadia et al. | |
| 2017/0147941 A1 | 5/2017 | Bauer et al. | |
| 2018/0210937 A1 | 7/2018 | Shi | |
| 2018/0293640 A1 | 10/2018 | Krappe | |
| 2018/0336514 A1 | 11/2018 | Ranjanghatmuralidhar et al. | |
| 2019/0286620 A1 | 9/2019 | Al-Haimi et al. | |
| 2019/0377807 A1 | 12/2019 | Dean et al. | |
| 2020/0045519 A1 | 2/2020 | Raleigh et al. | |
| 2020/0073642 A1 | 3/2020 | Koryakin | |
| 2020/0143313 A1 | 5/2020 | Ohlsson et al. | |
| 2020/0272981 A1 | 8/2020 | Kirkegaard | |
| 2022/0129477 A1 | 4/2022 | Son | |
| 2022/0210141 A1 | 6/2022 | Parekh et al. | |
| 2022/0245115 A1 | 8/2022 | Kulkarni et al. | |
| 2023/0058148 A1 | 2/2023 | Chen et al. | |
| 2023/0094635 A1 | 3/2023 | Meng et al. | |
| 2023/0099557 A1 | 3/2023 | Thapliyal | |
| 2023/0214773 A1 | 7/2023 | Ha | |
| 2023/0273915 A1 | 8/2023 | Dev | |
| 2023/0275973 A1 | 8/2023 | Sakamoto et al. | |
| 2023/0385288 A1 | 11/2023 | Kulkarni et al. | |
| 2024/0004860 A1 | 1/2024 | Soundararajan et al. | |
| 2024/0037115 A1 | 2/2024 | Simanjuntak et al. | |
| 2025/0217114 A1 | 7/2025 | Roper, Jr. et al. | |
| 2025/0328341 A1 | 10/2025 | Gutierrez | |
| 2025/0355656 A1 | 11/2025 | Khalil et al. | |

FOREIGN PATENT DOCUMENTS

| | | |
|---|---|---|
| CN | 118734829 A | 10/2024 |
| JP | 2019101725 A | 6/2019 |
| WO | 2025038523 A1 | 2/2025 |

OTHER PUBLICATIONS

Dey et al, "Appraise: a Governance Framework for Innovation with Artificial Intelligence Systems", ACM, pp. 1-13 (Year: 2024).*

Kundu et al, "Detecting Functional Safety Violations in Online AI Accelerators", IEEE, pp. 1-4 (Year: 2022).*

He et al, "EnhancingWeb Accessibility: Automated Detection of Issues with Generative AI", ACM, pp. 1-24 (Year: 2025).*

Robert et al, "Applying Generative AI to Detect Document Incompleteness, Inconsistencies, and Discrepancies", ACM, pp. 1-5 (Year : 2025).*

Pfefferle, J. "Moving from data lakes to data mesh", Oct. 18, 2022, medium.com, 22 pages (Year: 2022).

European Search Report for European Application No. 25201138.2, dated Jan. 7, 2026, 12 Pages.

Rahm E., et al., "A survey of approaches to automatic schema matching," the VLDB Journal, vol. 10, No. 4, 2001, pp. 334-350.

Sahay T., et al., "Schema Matching using Machine Learning," 2019, 07 Pages, arXiv:911.1154 [5].

Aksu E., et al., "Is Personalization the Future of User Interfaces A Systematic Mapping and Review," Proceedings of the 2025 International HCI and UX Conference, 2025, pp. 67-72.

Nallamothu T.K., "Enhance Cross-Device Experiences Using Smart Connect Ecosystem," International Journal of Technology, Management and Humanities, Aug. 30, 2023, vol. 9 No. 3, 5 pages.

Sivagnanasothy L., "How Change Data Capture is used for Real-Time Data Integration and Analytics," medium.com, May 22, 2019, 7 pages.

Tunalio O., et al., "Targeted Personalizated Product Bundle Generation," IEEE, 2021, 5 pages.

Van De Wiel., M., "Change Data Capture (CDC): Tools, Benefits, and Best Practices," fivetran.com, Aug. 4, 2022, 10 pages.

Examination Report issue in Australian Patent Application No. 2026200987, mailed Mar. 31, 2026, 7 pages.

Extended European Search Report for European Application No. 25227599.5, dated Apr. 14, 2026, 09 Pages.

Office Action issued in Japanese Patent Application No. 2025-151910, mailed Apr. 21, 2026, 9 pgs.

\* cited by examiner

500

600

Receive vendor catalog(s) in various format 605

Extract data from vendor catalog(s) 610

Process extracted data using ML 615

Analyze extracted data using ML model(s) 615

Map structured vendor data to unified platform schema 620

Manage integration workflow 630

Analyze structured data for insights 635

Visualized structured vendor information 640

Identify and resolve anomalies 645

AI BASED VENDOR AND CUSTOMER AGNOSTIC FRAMEWORK TO IMPROVE INTEGRATION OF LEGACY SYSTEMS

BACKGROUND

Integrating legacy systems and data from various vendors and customers into a unified platform presents significant challenges. Conventionally, legacy systems, such as Enterprise Resource Planning (ERP) systems, Customer Relationship Management (CRM) systems, and Configure, Price, Quote (CPQ) systems, operate in isolation. Each system uses different data formats, protocols, and operational standards, resulting in a heterogeneous technological landscape.

A primary challenge is the time and cost associated with integrating these disparate systems. Typically, integration projects require extensive manual coding, data mapping, and transformation efforts, often taking several months to years to complete. These projects also demand substantial financial investment due to the need for specialized personnel and resources. Furthermore, maintaining these integrations is cumbersome, as any updates or changes in the legacy systems necessitate additional adjustments and reconfigurations.

Another issue is the lack of interoperability between different systems. Legacy systems are often built on outdated technologies that do not support modern communication standards, making it difficult to facilitate data exchange. This results in fragmented data silos, where information is trapped within individual systems, hindering comprehensive data analysis and decision-making.

Moreover, the integration process frequently involves considerable friction. For instance, organizations must handle multiple vendor contracts, different service level agreements (SLAs), and varied support structures. This complexity extends to order management, where hardware, software, and cloud services are often procured and managed through separate channels, leading to inefficiencies and increased operational overhead.

Existing systems often impose significant operational burdens on vendors and customers by requiring changes to their existing formats, workflows, or frameworks. This rigidity creates friction and limits the adoption of new platforms. The conventional approach to integrating legacy systems encounters complexities resulting in prolonged timelines, high costs, interoperability issues, and operational friction. These problems hinder organizations' ability to achieve a unified, efficient, and agile technological ecosystem.

BRIEF SUMMARY OF THE INVENTION

Embodiments described herein provide an AI-based vendor and customer agnostic framework designed to improve the integration of legacy systems. Systems and methods are provided to dynamically adapt to and integrate customer-specific formats and frameworks while maintaining the integrity of its own unified schema is critical for reducing these barriers and facilitating seamless business operations. This framework leverages advanced artificial intelligence algorithms, including natural language processing and machine learning, to interpret and transform data from various legacy systems into a common format compatible with a unified platform. Embodiments described herein enable a unified platform to dynamically adapt to vendor and customer-specific formats, frameworks, and workflows. By eliminating the need for customers to modify their existing systems, the platform ensures seamless integration. The system adopts external data structures and transforms them into a canonical form while preserving the customer's original schema for continued interoperability. This capability allows customers to maintain their business operations 'as is' without disruption, while providing the benefits of a unified platform for streamlined data management and advanced analytics.

The framework significantly reduces the time and cost traditionally associated with integration by automating the data transformation process, facilitating rapid integration within weeks rather than months or years. A generative AI (Gen-AI) framework can support a unified order management system that consolidates hardware, software, and cloud services into a single interface, minimizing operational friction. The self-learning component of the framework can analyze transactional data to provide actionable insights and recommendations, enhancing decision-making capabilities. By being vendor and customer agnostic, the framework ensures compatibility with a wide range of systems without requiring significant changes, thus offering a comprehensive solution to the longstanding challenges of integrating diverse legacy systems.

For example, a computing device can use the AI-based framework to analyze and map data from a vendor's legacy ERP/CRM systems or other data sources. The device employs natural language processing (NLP) algorithms to interpret unstructured data and machine learning (ML) models to learn the data structures and formats used by the legacy system. Once analyzed, the computing device transforms this data into a common format compatible with the unified platform. This process can include schema mapping, data cleansing, and format conversion, all performed automatically by the AI algorithms. The transformed data can then be integrated into the unified platform, facilitating interaction and interoperability with other systems. This automation significantly reduces the time and effort required for integration, enabling the computing device to complete the process in weeks rather than months, without necessitating extensive manual coding or data mapping efforts.

In some embodiments, a computing device can utilize the AI-based framework to facilitate the integration of a customer's legacy system. The computing device employs NLP methodologies to understand and extract relevant data fields from the legacy system. Using ML models, the device identifies patterns and relationships within the data, enabling it to create accurate mappings to the unified platform's data schema. This automated process can include tasks such as data normalization, deduplication, and transformation, ensuring that the data from the CRM system can be compatible with the unified platform. Once the data is transformed, the computing device can integrate it into the unified platform, facilitating data exchange and interaction with other integrated systems. This embodiment demonstrates the capability of the AI-based framework to handle diverse data types and structures, significantly reducing the complexity and duration of integration projects.

In some embodiments, the computing device can also employ the AI-based framework to continuously monitor and optimize the integration process. Initially, the device gathers data from the customer's legacy systems, applying NLP to extract meaningful information from unstructured text fields, such as customer notes or communication logs. ML algorithms then analyze this data to detect patterns, such as common customer inquiries or frequent issues, and generate a data schema that aligns with the unified platform's structure.

The computing device performs data normalization, ensuring consistency in data formats, units, and naming conventions. It also can execute deduplication routines to identify and merge duplicate records, maintaining data integrity and accuracy. Transformation algorithms convert the legacy data into a format that the unified platform can efficiently ingest and utilize.

Once the initial integration is complete, the computing device continuously monitors the data flow between the legacy system and the unified platform. It uses machine learning models to identify any discrepancies or anomalies in real-time, triggering automated corrective actions to resolve these issues promptly. The device can also adapt to changes in the legacy system, such as software updates or modifications in data structures, ensuring ongoing compatibility without the need for extensive reconfiguration.

Further, the computing device can leverage the AI-based framework to provide actionable insights derived from the integrated data. It can analyze customer interaction data to identify trends, such as emerging customer needs or declining satisfaction levels, and generate recommendations for targeted marketing campaigns or product improvements. The device can also assess the performance of the integrated system, offering suggestions to enhance operational efficiency and customer service quality.

In some embodiments, a system for integrating legacy systems into a unified platform can include a server, coupled to a processor, and configured to execute instructions that ingest, normalize, and store data, by a data layer, from multiple sources. The system can further include a processing layer configured to analyze and transform data using AI algorithms and a presentation layer configured to provide a dynamic user interface for data visualization and interaction.

In some embodiments, the data layer can include connectors and APIs to facilitate data extraction from legacy systems such as ERP, CRM, and CPQ, supporting multiple data formats and communication protocols. The data layer can include preprocessing units that clean and standardize data, employing techniques such as tokenization, stemming, lemmatization, scaling, and transformation. The processing layer can include a workflow orchestration engine that can manage integration workflows facilitating data flow between legacy systems and the unified platform. The processing layer can include an AI and analytics module featuring a self-learning AI engine that continuously adapts integration processes based on new data and user interactions. The presentation layer can include customizable dashboards that provide real-time data insights and interactive visualizations such as charts, graphs, and heat maps. The presentation layer can include security features such as role-based access controls, secure login mechanisms, and data encryption both in transit and at rest.

In some embodiments, a computerized method for processing email orders can include receiving, by a computing device, an email containing order information. The method further can include extracting, by the computing device, data from the email content and attachments and processing the extracted data using natural language processing techniques to parse and structure the information. The method can include analyzing, by the computing device, the extracted data using machine learning models to identify patterns and relationships within the data, facilitating accurate data mapping and transformation. The method can include mapping, by the computing device, the structured data to a unified platform's schema, performing normalization, deduplication, and conversion tasks. The method can include managing, by the computing device, the integration workflow using a workflow orchestration engine to facilitate data flow into an order management system. The processed order data can be analyzed, by the computing device, by a predictive analytics module to provide insights and recommendations such as inventory needs, supply chain disruptions, and optimal shipping methods. The method can include visualizing, by the computing device, the processed order data in a customizable dashboard that displays real-time data insights and actionable items tailored to user roles and preferences. The method can include identifying and resolving, by the computing device, data errors or anomalies during the process using an exception management system to maintain data accuracy and reliability.

In some embodiments, a computerized method for processing vendor catalogs can include receiving, by a computing device, vendor catalogs in various formats. The method further can include extracting, by the computing device, data from the catalogs using data ingestion engines and processing the extracted data using natural language processing techniques to parse and structure the information. The method can include analyzing, by the computing device, the extracted data using machine learning models to identify patterns and relationships within the catalog data, facilitating accurate data mapping and transformation. The method can include mapping, by the computing device, the structured catalog data to a unified platform's schema, performing normalization, deduplication, and conversion tasks. The method can include managing, by the computing device, the integration workflow using a workflow orchestration engine to facilitate data flow into a product management system. The processed catalog data can be analyzed, by the computing device, by a predictive analytics module to provide insights and recommendations such as product demand forecasts, vendor pricing trends, and optimal inventory levels. The method can include visualizing, by the computing device, the processed catalog data in a customizable dashboard that displays real-time data insights and actionable items tailored to user roles and preferences, and resolving, by the computing device, data errors or anomalies using an exception management system.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
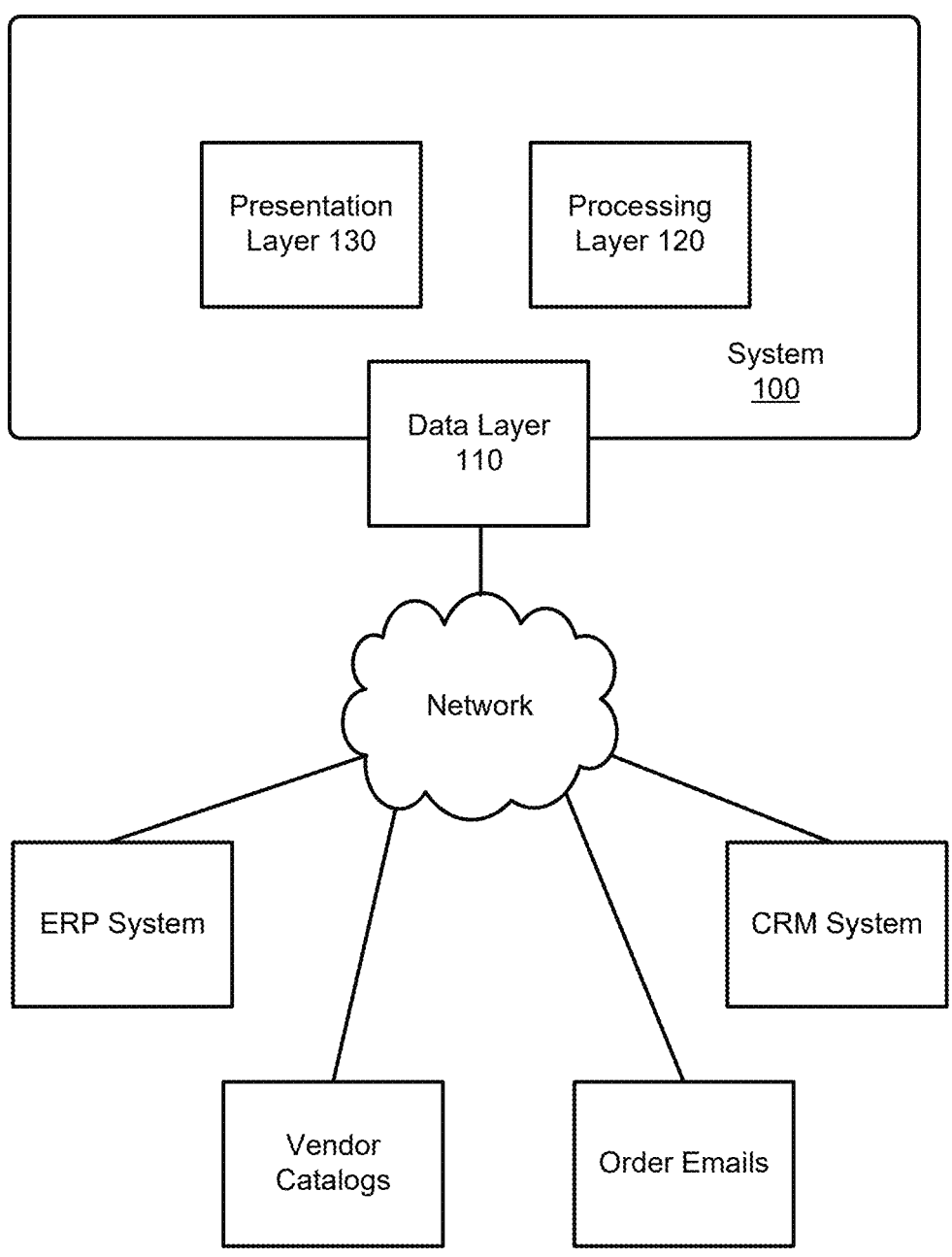
FIG. 1 is an illustration of a system for providing an AI-based vendor and customer agnostic framework to integrate legacy systems into a distribution platform, according to some embodiments.

FIG. 1 illustrates System 100 for providing an AI-based vendor and customer agnostic framework to integrate legacy systems into a distribution platform, according to some embodiments. System 100 can include Data Layer 110, Processing Layer 120, and Presentation Layer 130, each configured to support specific functionalities within the platform.

Data Layer 110 can be configured to manage the ingestion, normalization, and storage of a vast array of data types from multiple sources. Its configuration allows for robust data handling capabilities to ensure the platform operates with high levels of accuracy and efficiency, necessary for the IT distribution sector. Data Layer 110 can be configured to automate the ingestion of data from various sources, including direct uploads, APIs, databases, and external systems such as ERP, CRM, and CPQ platforms. This layer utilizes a series of data adapters and connectors capable of interfacing with diverse data formats, such as XML, JSON, CSV files, and unstructured data like emails and documents. These adapters can be designed to be highly modular and configurable, enabling quick adjustments to accommodate new data sources or changes in data structure without significant redevelopment.

Once data is ingested, Data Layer 110 can include one or more preprocessing units that utilize algorithms to clean and standardize the data. These units address common data issues such as missing values, inconsistent formats, and errors in data entry. The normalization process involves techniques such as tokenization, stemming, and lemmatization, particularly when processing textual data. For numerical data, normalization might involve scaling and transformation processes to bring data into a uniform scale necessary for subsequent analytical tasks. In conjunction with normalization, Data Layer 110 can include validation mechanisms that apply a set of predefined rules and machine learning models to ensure data integrity and correctness.

These validation processes maintain the quality of data in the platform, as they detect anomalies and potential inaccuracies that could affect the overall system performance. Validation algorithms might include integrity checks, such as checksum validations and data type verifications, ensuring that incoming data matches the expected patterns and formats.

Data Layer 110 can also be configured with transformation tools that convert raw data into more useful formats. This can include the aggregation of data points, the calculation of new metrics based on raw data inputs, and the restructuring of data into dimensions suitable for analysis and reporting. These transformations can be handled by a combination of procedural code and configuration-driven frameworks, allowing for flexibility in how data can be manipulated and stored. For storage, Data Layer 110 can be configured to integrate both SQL and NoSQL database technologies. SQL databases can be used for structured data that require complex queries with high accuracy and integrity, such as financial records and transaction logs. NoSQL databases can be employed for their flexibility in handling semi-structured or unstructured data, as well as for situations where high write speeds and horizontal scalability are required. This dual-database approach allows Data Layer 110 to efficiently manage diverse data needs and query requirements, optimizing both performance and scalability.

Data Layer 110 can include comprehensive security measures such as encryption at rest and in transit, rigorous access controls, and continuous monitoring for unauthorized access attempts. Security protocols can be integrated into every component of the data layer to safeguard sensitive information from external threats and internal vulnerabilities. Data Layer 110 can include automated backup and disaster recovery solutions to protect data against loss due to system failures, cyberattacks, or other unexpected events. These solutions can be configured to perform regular backups of all data stored within the system and to enable quick recovery in the event of data loss, minimizing downtime and ensuring data availability and continuity. Data Layer 110 can incorporate AI and machine learning algorithms directly into the data management processes via Processing Layer 120. These algorithms can be used for predictive analytics, such as forecasting demand or identifying potential market trends based on historical data. Machine learning models can be trained and deployed within Data Layer 110 to continuously improve data handling and processing based on incoming data streams, making the system progressively smarter and more efficient.

Data Layer 110 of System 100 can thereby be configured to handle the complex data management needs of an IT distribution platform. Its configuration allows it to manage a wide range of data types and sources efficiently, ensuring high data quality and security. The layer serves as the foundation for the platform, supporting advanced data processing capabilities that enable effective decision-making and operational efficiency in IT distribution. Processing Layer 120 can provide a core analytical engine of System 100, where vast amounts of data collected and pre-processed by Data Layer 110 can be further analyzed and transformed into actionable insights. This layer can be configured to leverage LLMs, AI and ML algorithms to enhance data processing and decision-making capabilities.

Processing Layer 120 can be configured to execute machine learning algorithms that handle a variety of analytical tasks. These algorithms can be configured to perform customer segmentation by analyzing customer data and grouping customers into distinct categories based on their behaviors, preferences, and purchasing histories. This segmentation enables targeted marketing and personalized service offerings. Demand forecasting algorithms analyze historical sales data along with external variables such as market trends and seasonal factors to predict future product demand, assisting in inventory planning and management. Inventory management algorithms optimize stock levels based on real-time sales data and forecasts to reduce overstock and outages, enhancing operational efficiency. In some embodiments, Processing Layer 120 can incorporate Robotic Process Automation (RPA) to automate routine and repetitive tasks that can be time-consuming when performed manually. This automation can extend to data entry, report generation, and the execution of predefined data queries and transfers, which significantly reduces the need for manual intervention. By automating these tasks, RPA not only accelerates the data processing workflow but also minimizes human errors, ensuring more accurate and reliable outputs.

Processing Layer 120 can perform AI-driven automation, enabling the system to adapt and improve continuously. This aspect of the layer can include adaptive learning algorithms that adjust and optimize their operations based on new data and feedback loops. For example, predictive models within the layer can be continuously refined as they are exposed to new sales data and customer interactions, improving their accuracy and relevance over time. This capability ensures that the system remains effective in dynamic market conditions and can anticipate changes before they occur. Processing Layer 120 can be configured to communicate data between the various layers and components of System 100. It can perform integration of processed data back into Data Layer 110 for storage and synchronization with Presentation Layer 130 to display the processed information. This integration can be managed through a series of APIs and data management protocols that ensure data consistency and integrity across the platform.

Processing Layer 120 can be configured with advanced analytics capabilities that enable it to perform complex data analyses and generate comprehensive reports. These analyses include multivariate testing, correlation analysis, and regression models that help uncover deeper insights into business operations and customer behavior. The layer also can support real-time analytics, providing immediate feedback and insights that can be acted upon swiftly. Given the nature of the tasks performed within Processing Layer 120, security measures can be embedded within the layer to protect data integrity and privacy. This can include the implementation of secure data access protocols, encryption of sensitive data, and regular audits to comply with industry regulations and standards.

Processing Layer 120 can be designed for scalability, capable of handling increasing volumes of data without degradation in performance. It uses a distributed computing model that allows processing tasks to be scaled across multiple servers as needed. Additionally, the flexibility facilitates integrating new algorithms, models and techniques as they advance. Presentation Layer 130 can be configured as the interface of System 100, where the processed data from Processing Layer 120 can be visualized and made accessible to users in a meaningful and actionable format. This layer can be provided to accommodate a diverse range of user needs and entities, ensuring that data presentation is intuitive, current, and effectively presented to enhance user decision-making across various organizational roles.

Presentation Layer 130 can be configured with a dynamic user interface that adapts to the specific requirements of different users, such as vendors, distributors, and resellers. It can be configured to provide customizable dashboards that display tailored information based on user roles and preferences. This customization capability allows for the interface to automatically adjust its layout, content, and complexity depending on whether the user is an associate needing detailed customer analytics, a vendor reviewing inventory levels, or a reseller reviewing cost metrics. Presentation Layer 130 incorporates data visualization tools to convert complex datasets into graphical representations such as push notifications and insights, as well as charts, graphs, heat maps, and the like. These tools enable users to understand large volumes of data quickly and accurately, facilitating the grasp of detailed insights without delving into raw data. The layer can support interactive visualizations that users can manipulate to explore data points in depth, such as drilling down into a sales trend chart or adjusting the parameters of a financial forecast.

This layer can be configured to update its displays in real-time, pulling data continuously from Processing Layer 120. This ensures that all information presented can be current, reflecting the most current business conditions and enabling immediate action when required. The real-time capability can impact decision-making, such as adjusting pricing in response to inventory levels or responding to customer service inquiries. Presentation Layer 130 can be configured to be accessible on multiple devices, including desktops, tablets, and smartphones, ensuring that users can access information anytime and anywhere. The responsive design adapts the display to fit different screen sizes and resolutions, providing a consistent user experience across all devices.

The layer also can include features that enhance collaboration among team members. Tools such as shared dashboards, real-time annotation capabilities, and integrated communication platforms (e.g., chat functions) allow users to discuss data-driven insights directly within the platform, fostering a collaborative decision-making environment. Given the sensitivity of the data handled, Presentation Layer 130 can be configured with robust security features to protect user information and maintain data confidentiality. These features include role-based access controls that ensure users can only view data pertinent to their role, secure login mechanisms, and data encryption both in transit and at rest.

To extend functionality and user utility, Presentation Layer 130 can be designed to integrate efficiently with external applications such as CRM systems, financial software, and marketing tools. This integration can be facilitated through APIs that allow for the smooth flow of data between System 100 and other business systems, enabling users to leverage the platform's insights within other operational contexts. Presentation Layer 130 can be optimized for performance, ensuring fast loading times and smooth interactions even with large datasets and complex visualizations. The architecture can support scalability, accommodating an increasing number of users and more complex data visualizations without compromising performance. Presentation Layer 130 can provide a persona-based, customizable, and secure interface that enhances the overall user experience. By transforming processed data into easily understandable and interactive formats, it enables effective communication of insights across various organizational levels, driving informed decisions and actions. Thereby, System 100 can integrate Data Layer 110, Processing Layer 120, and Presentation Layer 130 into a unified platform configured to enhance the efficiency of IT distribution by automating key processes and providing a customizable user interface tailored to the specific needs of its users.

System 100 incorporates an AI-based vendor and customer agnostic framework through a generative AI (Gen-AI) Engine within Processing Layer 120. This engine can automate the adaptation of the platform to various external systems brought by different vendors and customers, regardless of their underlying technology or data structure. The Gen-AI Engine can provide an improvement in reducing time required for complex processes. For example, tasks that typically take five to ten days can be completed in under four minutes, even for substantial codebases. The Gen-AI Engine removes complexity from platforms, can integrate various services like hardware, cloud subscriptions, and services into a single order ticket, and minimizes friction.

Furthermore, the Gen-AI framework facilitates the integration of legacy systems from vendors and customers into the platform with minimal effort. This agnostic framework translates data formats, facilitating integration in weeks rather than years, thus avoiding the significant costs and delays traditionally associated with such integrations. This capability can be demonstrated through a successful integration with a security vendor's complex legacy systems. The Gen-AI technology can be an artificial intelligence framework designed to streamline and simplify complex processes in the technology and distribution industries. It drastically reduces processing times, transforming tasks that usually take several days into operations completed within seconds or minutes. This technology removes complexity from platforms, can integrate various services like hardware, cloud subscriptions, and services into a single order ticket, and minimizes operational friction. It features a self-learning component that can analyze vast amounts of transactional data to provide insights and recommendations, allowing users to understand performance metrics and identify profitable areas. The framework can be customer and vendor agnostic, capable of integrating with various legacy systems through AI-driven data transformation, thus reducing the time and cost typically associated with such integrations.

For example, a Gen-AI engine can include NLP and ML Algorithms to interpret and transform data from various legacy systems into a common format. NLP algorithms can facilitate understanding and processing unstructured data, while ML models train from past data to improve transformation accuracy. A Data Transformation and Integration Layer incorporates AI models to map and convert data from different vendor and customer systems into a unified format compatible with the Gen-AI platform. This can include schema mapping, data cleansing, and transformation algorithms. A Unified Order Management System can integrate multiple services into a single interface, employing database management systems and API integrations to handle hardware, software, and cloud subscriptions within one platform. A Self-Learning and Analytics Engine uses advanced machine learning algorithms, such as neural networks and decision trees, to analyze transactional data. It can provide insights and predictions about performance metrics, market trends, and profitability.

The Gen-AI framework can be provided on a scalable infrastructure, possibly leveraging cloud computing resources to handle large volumes of data and ensure quick processing times. This infrastructure can support the real-time processing capabilities of the Gen-AI technology. In addition, one or more security and compliance modules can ensure that data is handled securely and in compliance with relevant regulations. They use encryption algorithms, access controls, and auditing mechanisms to protect sensitive information. The engine can automate data ingestion and integration of various vendor and customer systems into the distribution platform. More specifically, the Gen-AI Engine of Processing Layer 120 can automate ingestion of data from multiple sources using artificial intelligence to handle and process different data formats automatically, whether they are structured data like spreadsheets and databases or unstructured data such as emails and documents. It can be configured to work across various vendor and customer platforms without the need for manual configuration. This capability can be derived from the engine's use of AI algorithms that can quickly learn and adapt to new data formats and operational protocols, facilitating integration regardless of the external system's architecture.

The engine can process and normalize the ingested data, ensuring it fits the required formats and standards needed for accurate analysis and reporting within the platform. This process can include cleaning the data, resolving inconsistencies, and transforming it into a usable state. By leveraging AI, the Gen-AI Engine facilitates self-service capabilities that allow non-technical users to configure and manage the integration settings and data processing rules. This empowers users to make adjustments tailored to their specific operational needs without deep technical expertise. The AI-driven nature of the Gen-AI Engine can support scalability and flexibility, allowing System 100 to expand its capacity and functionality as new types of data sources are added or as customer and vendor requirements evolve.

The Gen-AI Engine starts by analyzing incoming data from diverse sources, such as ERP systems, direct uploads, or external databases. It employs classification algorithms to recognize data formats and structures. This process does not rely on predefined rules but rather on the engine's capability to learn and recognize patterns over time to operate across a wide range of vendor and customer interfaces without manual reconfiguration. Once the data format and structure are identified, transformation algorithms convert the data into a uniform format compatible with System 100. This ensures consistency across the data processed within the system, ensuring that subsequent data handling, storage, and analysis can be conducted efficiently. These transformation processes can be dynamic and tailored in real-time, allowing the system to adapt quickly to new data without the need for human intervention.

The system also incorporates predictive analytics within the Gen-AI Engine to forecast potential issues or needs based on the data being processed. This capability allows System 100 to not only react to current data configurations but also anticipate future changes in vendor or customer data streams, enhancing the system's proactive management features. In terms of user interaction, the Presentation Layer 130 dynamically adjusts based on the processed data, ensuring that each user, whether a vendor manager, finance professional, or sales associate, sees information and controls relevant to their specific needs and roles. This personalization extends to data visualization and user interface customization, facilitated by the AI-driven backend which tailors the presentation and accessibility of information based on user preferences learned over time.

The configuration of System 100 enables reduction of the manual workload typically associated with integrating new vendor systems or adjusting to changes in customer data requirements. By automating these processes, System 100 can reduce operational delays and errors, improve data integrity, and enhance user engagement by providing a more responsive and intuitive platform.

Figure 2:
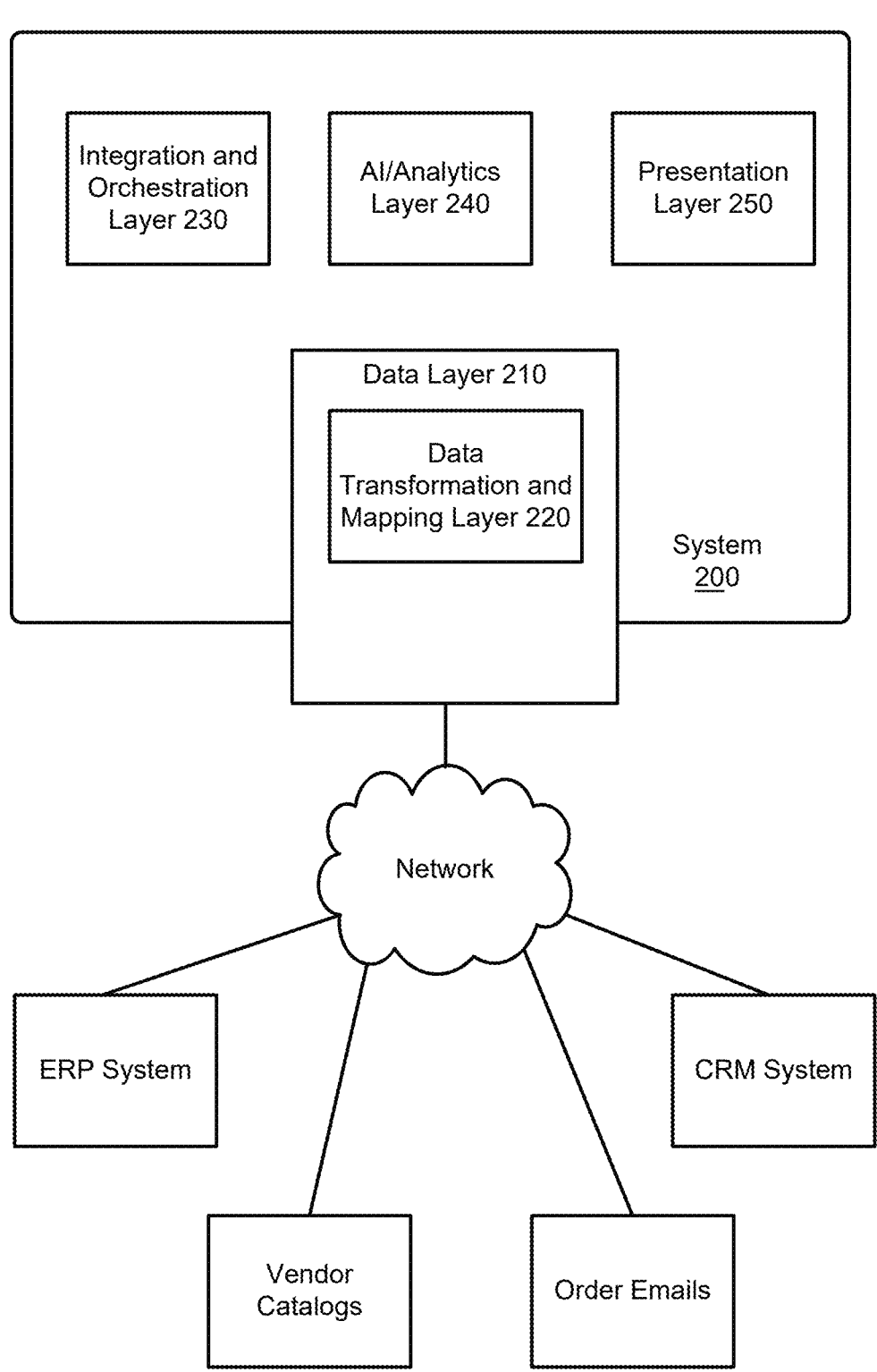
FIG. 2 is an illustration of a system for providing an enhanced AI-based vendor and customer agnostic framework to improve the integration of legacy systems, according to some embodiments.

FIG. 2 illustrates System 200 for providing an enhanced AI-based vendor and customer agnostic framework to improve the integration of legacy systems, according to some embodiments. System 200 can include Data Layer 210, Data Transformation and Mapping Layer 220, Integration and Orchestration Layer 230, AI and Analytics Layer 240, and Presentation Layer 250, each configured to support specific functionalities within the platform.

Data Layer 210, also referred to as the Real-Time Data Mesh (RTDM) Layer, can be configured to manage the ingestion, normalization, and storage of a vast array of data types from multiple sources. It can include connectors and APIs that facilitate the extraction of data from different legacy systems such as ERP, CRM, and CPQ. The connectors support multiple data formats and communication protocols, including XML, JSON, CSV, and unstructured data formats such as emails and documents. The Data Ingestion Engine within this layer collects data in real-time or batch mode, depending on the system's capabilities and requirements.

Data Layer 210 can include data adapters and connectors capable of interfacing with diverse data formats. Once data is ingested, preprocessing units within this layer utilize algorithms to clean and standardize the data, addressing issues such as missing values, inconsistent formats, and errors in data entry. The normalization process involves techniques such as tokenization, stemming, and lemmatization for textual data, and scaling and transformation processes for numerical data. Validation mechanisms apply predefined rules and machine learning models to ensure data integrity and correctness. Data transformation tools within this layer convert raw data into more useful formats, including the aggregation of data points, calculation of new metrics, and restructuring of data for analysis and reporting. For storage, Data Layer 210 can integrate both SQL and NoSQL database technologies. Comprehensive security measures and automated backup and disaster recovery solutions can also be included to ensure data security and availability.

Data Transformation and Mapping Layer 220 can include an NLP module that utilizes NLP to understand and extract relevant information from unstructured data sources, such as customer notes or emails within legacy systems. ML models analyze historical data to identify patterns and relationships, facilitating accurate data mapping and transformation. A Schema Mapping Engine automatically maps data schemas from legacy systems to the unified platform's schema, handling data normalization, deduplication, and conversion tasks.

Integration and Orchestration Layer 230 can include a Workflow Orchestration Engine that can manage the end-to-end integration workflow, facilitating data flow between legacy systems and the unified platform. An API Gateway can provide a centralized interface for accessing the transformed data, facilitating interaction between different systems and the unified platform.

AI and Analytics Layer 240 features a Self-Learning AI Engine that continuously learns from new data and user interactions, adapting the integration processes to improve efficiency and accuracy over time. Additionally, a Predictive Analytics Module can provide insights and recommendations based on the integrated data, helping users make informed decisions. This layer can support advanced analytics capabilities, including multivariate testing, correlation analysis, and regression models, as well as real-time analytics to provide immediate feedback and insights.

Presentation Layer 250, also referred to as the Single Pane of Glass (SPoG) user interface, can be configured as the interface of System 200, where the processed data from the AI and Analytics Layer 240 can be visualized and made accessible to users in a meaningful and actionable format. This layer can be equipped with a dynamic user interface that adapts to the specific requirements of different users, such as vendors, distributors, and resellers. It can provide customizable dashboards that display tailored information based on user roles and preferences. The layer incorporates advanced data visualization tools designed to convert complex datasets into graphical representations such as charts, graphs, and heat maps. Real-time data updates ensure that all information presented is current, enabling immediate action when required.

Presentation Layer 250 can be configured to be accessible on multiple devices, including desktops, tablets, and smartphones, ensuring that users can access information anytime and anywhere. The responsive design adapts the display to fit different screen sizes and resolutions. Features that enhance collaboration among team members, such as shared dashboards, real-time annotation capabilities, and integrated communication platforms, can be included. Robust security features protect user information and maintain data confidentiality through role-based access controls, secure login mechanisms, and data encryption.

System 200 can also include customizable integration settings that allow users to specify authorized domains, input sources, and business rules for data processing. A robust exception management system identifies and addresses data errors, system errors, and other anomalies, maintaining data integrity and ensuring smooth operation. The system is designed for scalability, capable of handling increasing volumes of data and new integration requirements without compromising performance.

Practical implementation examples of System 200 include processing vendor catalogs, converting them from various formats into the platform's standard format, and converting email orders into system-readable formats. The system handles bid data from vendors, transforming and integrating it into the platform to streamline bid management and decision-making.

System 200 can provide comprehensive use cases, integrating both vendor and customer systems, and ensuring real-time data synchronization between integrated systems. This universality eliminates the need for separate solutions for different stakeholders and maintains up-to-date information across the platform.

Figure 3:
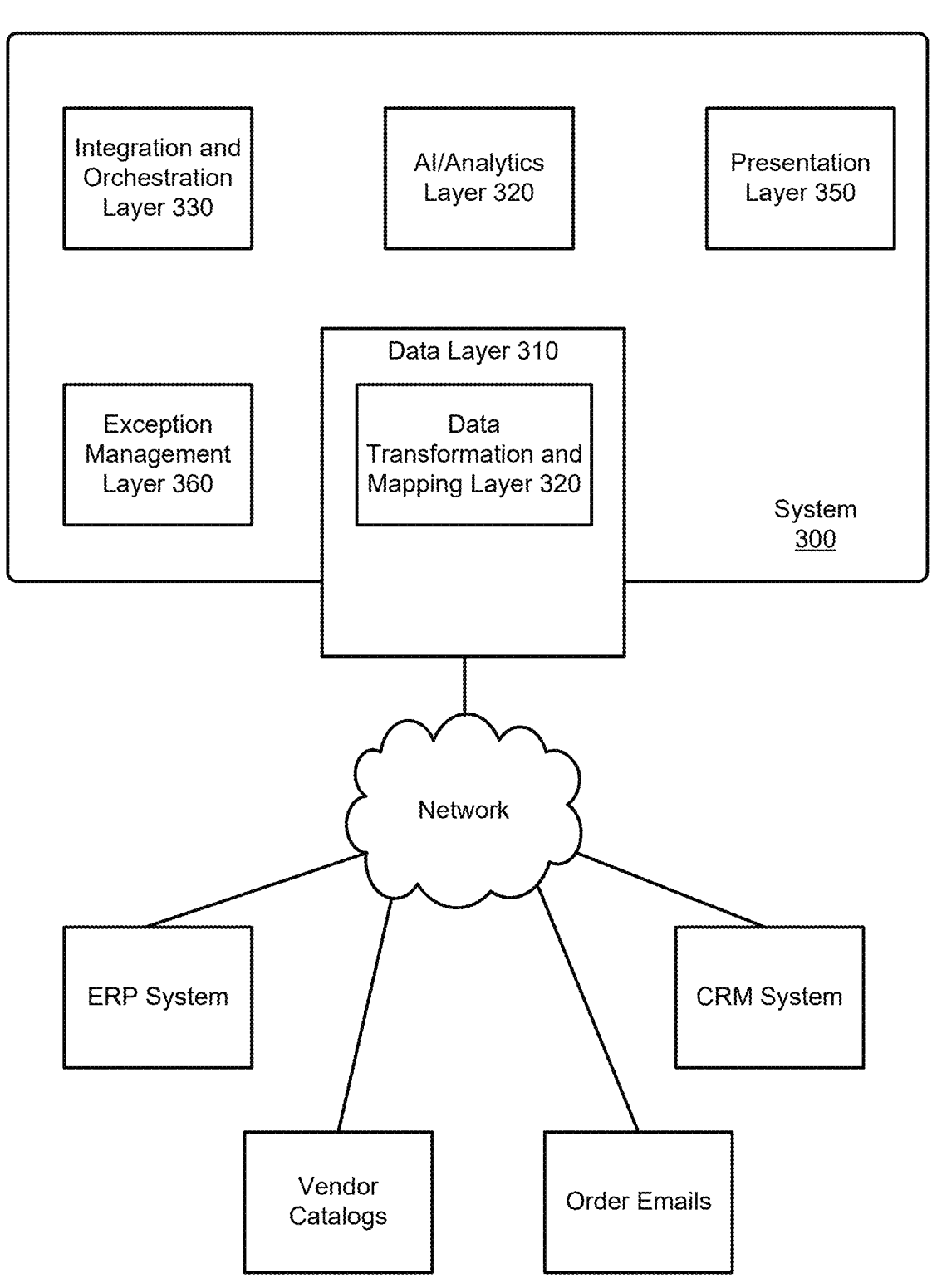
FIG. 3 is a flow diagram of a system supporting real-time AI-driven integration within an enhanced AI-based vendor and customer agnostic framework to improve the integration of legacy systems, according to some embodiments.

FIG. 3 illustrates System 300 in an exemplary embodiment for supporting real-time AI-driven integration within an enhanced AI-based vendor and customer agnostic framework to improve the integration of legacy systems. System 300 can include a Real-Time Data Ingestion Layer 310, Data Transformation and Mapping Layer 320, Integration and Orchestration Layer 330, AI and Analytics Layer 340, Presentation Layer 350, and Exception Management Layer 360.

Real-Time Data Ingestion Layer 310 can be configured to handle the ingestion of data from various formats such as emails, PDFs, spreadsheets, and other documents into a standardized platform format. This layer can include connectors and APIs for extracting data from diverse legacy systems, supporting multiple data formats and communication protocols. The Data Ingestion Engine within this layer collects data in real-time or batch mode, depending on the system's capabilities and requirements, ensuring continuous and efficient data flow into the platform.

Data Transformation and Mapping Layer 320 can include a NLP module that utilizes NLP techniques to understand and extract relevant information from unstructured data sources. ML models within this layer analyze historical data to identify patterns and relationships, facilitating accurate data mapping and transformation. The Schema Mapping Engine automatically maps data schemas from legacy systems to the unified platform's schema, performing necessary normalization, deduplication, and conversion tasks. This layer emphasizes the use of self-learning AI models that continuously adapt to new data formats and vendor-specific requirements, reducing the need for constant manual reconfiguration and enabling more efficient and accurate handling of new integrations.

Integration and Orchestration Layer 330 can include a Workflow Orchestration Engine that can manage the end-to-end integration workflow, facilitating data flow between legacy systems and the unified platform. The API Gateway within this layer can provide a centralized interface for accessing the transformed data, facilitating interaction between different systems and the unified platform. This layer highlights the system's universal data format compatibility, allowing it to integrate with any vendor or customer system regardless of the data format they use, thus eliminating the need for bespoke solutions and significantly reducing integration time and cost.

AI and Analytics Layer 340 features a Self-Learning AI Engine that continuously learns from new data and user interactions, adapting the integration processes to improve efficiency and accuracy over time. The Predictive Analytics Module within this layer can provide insights and recommendations based on the integrated data, helping users make informed decisions. This layer can support advanced analytics capabilities, including multivariate testing, correlation analysis, and regression models, as well as real-time analytics to provide immediate feedback and insights.

Presentation Layer 350, referred to as the Single Pane of Glass (SPoG) user interface, can be configured to visualize and make accessible the processed data from AI and Analytics Layer 340 in a meaningful and actionable format. This layer can provide a dynamic user interface that adapts to the specific requirements of different users, such as vendors, distributors, and resellers. It offers customizable dashboards that display tailored information based on user roles and preferences. Advanced data visualization tools within this layer convert complex datasets into graphical representations such as charts, graphs, and heat maps. Real-time data updates ensure that all information presented can be current, enabling immediate action when required.

Exception Management Layer 360 can be an advanced system that identifies and resolves data errors, system anomalies, and other issues in real-time. This layer can include robust exception management capabilities that ensure data integrity and smooth operation, maintaining the reliability and accuracy of the integrated data. This enables System 300 to manage anomalies that could otherwise disrupt the workflow and impact operational efficiency.

In a non-limiting example, email orders can be converted into structured data formats that the system can process automatically. Real-Time Data Ingestion Layer 310 can extract data from email content and attachments, which can then be processed by the NLP module and ML models in the Data Transformation and Mapping Layer 320. These components analyze and transform the unstructured email data into a standardized format. A Workflow Orchestration Engine in Integration and Orchestration Layer 330 can manage the integration workflow, ensuring that the transformed data can be efficiently aggregated into the order management system. AI and Analytics Layer 340 can provide predictive insights and recommendations based on the processed order data, and Presentation Layer 350 visualizes this information in a user-friendly dashboard. Exception Management Layer 360 addresses any data errors or anomalies during the process, ensuring accuracy and reliability.

For example, Real-Time Data Ingestion Layer 310 initiates extracting data from email content and attachments. This layer can include connectors and APIs that facilitate the extraction of data from various sources, supporting multiple data formats and communication protocols. When an email order is received, the Data Ingestion Engine captures the email and its attachments in real-time or batch mode, depending on the system's configuration. The engine then initiates the data extraction process, identifying relevant data fields such as order details, customer information, product descriptions, and quantities.

Once the data is ingested, it can be pushed to Data Transformation and Mapping Layer 320, which can include a NLP module and ML models that process and analyze the unstructured email data. The NLP module parses the email content to understand and extract relevant information from text, such as customer notes, order instructions, and special requests. Concurrently, the ML models analyze historical data to identify patterns and relationships, facilitating accurate data mapping and transformation. The Schema Mapping Engine within this layer automatically maps the extracted data to the unified platform's schema, performing necessary normalization, deduplication, and conversion tasks. This transformation converts the unstructured email data into a standardized format that the system can process.

The transformed data can be pushed to Integration and Orchestration Layer 330, where the Workflow Orchestration Engine can manage the end-to-end integration workflow. This engine ensures that the transformed data can be efficiently aggregated into the order management system, coordinating various tasks and processes required for integration. An API Gateway within this layer can provide a centralized interface for accessing the transformed data, enabling interaction between different systems and the unified platform. The orchestration engine handles the sequencing of integration tasks, including data validation, error handling, and system synchronization, ensuring a smooth and efficient workflow.

As the data flows through the system, the AI and Analytics Layer 340 can provide additional processing and analysis. This layer can incorporate a Self-Learning AI Engine that continuously learns from new data and user interactions, adapting the integration processes to improve efficiency and accuracy over time. A Predictive Analytics Module within this layer can analyze the processed order data to provide insights and recommendations. For example, it can forecast inventory needs based on order trends, identify potential supply chain disruptions, or recommend optimal shipping methods. These predictive insights help users make informed decisions, enhancing the overall efficiency and effectiveness of the order management process.

Processed data can then be visualized in the Presentation Layer 350, i.e., the SPOG user interface. This layer can provide a dynamic user interface that adapts to the specific requirements of different users. It offers customizable dashboards that display real-time data, insights, and actionable items tailored to user roles and preferences. Advanced data visualization tools within this layer convert complex datasets into graphical representations such as charts, graphs, and heat maps, making it easier for users to understand and act on the information. For instance, a sales manager can view real-time order status and inventory levels, while a customer service representative can track order fulfillment and address customer inquiries promptly.

Throughout the entire process, Exception Management Layer 360 maintains data integrity and efficient operation. This layer can include exception management capabilities that identify and resolve data errors, system anomalies, and other issues in real-time. For example, if an email order contains incomplete or inconsistent data, the exception management system flags the issue and prompts corrective action, either by automated processes or manual intervention. This proactive approach helps maintain the accuracy and reliability of the integrated data, preventing disruptions in the workflow and providing a current, persistent order management process.

System 300 achieves end-to-end process automation through the integration of these layers, automating processes from data ingestion and transformation to order creation and management. This approach ensures an efficient workflow, reducing manual intervention at all stages. The system's cross-functional utility can provide customized interfaces and workflows for various functions and roles, enhancing user experience and operational effectiveness across vendors, customers, resellers, associates, and internal employees.

System 300 can be configured to scale with business requirements, handling increasing volumes of data and new integration requirements without compromising performance. In another non-limiting example, practical implementation can include processing vendor catalogs, converting them from various formats into the platform's standard format, and handling bid data from vendors. The system's ability to convert email orders into structured data showcases its capability to handle real-world scenarios and improve operational efficiency.

For example, Real-Time Data Ingestion Layer 310 can initiate extracting data from vendor catalogs. Vendor catalogs can be provided in various formats, such as PDFs, spreadsheets, and documents. The Data Ingestion Engine captures these catalogs through connectors and APIs, which support multiple data formats and communication protocols. The engine initiates the data extraction process by identifying and capturing relevant data fields, such as product descriptions, prices, stock levels, and vendor details. Once the data is ingested, it can be processed by the Data Transformation and Mapping Layer 320. This layer can include a NLP module and ML models that analyze and transform the unstructured catalog data into a standardized format. The NLP module parses the content to extract relevant information, while ML models identify patterns and relationships within the data, facilitating accurate mapping and transformation. The Schema Mapping Engine automatically maps the extracted data to the unified platform's schema, performing normalization, deduplication, and conversion tasks. This transformation ensures that the catalog data is consistent and usable within the platform.

The transformed catalog data then moves to the Integration and Orchestration Layer 330. The Workflow Orchestration Engine within this layer can manage the end-to-end integration workflow, facilitating data flow into the product management system. The API Gateway can provide a centralized interface for accessing the transformed data, enabling interaction between different systems and the unified platform. The orchestration engine coordinates tasks such as data validation, error handling, and system synchronization, ensuring a smooth and efficient workflow.

The AI and Analytics Layer 340 can provide additional processing and analysis of the catalog data. The Self-Learning AI Engine continuously learns from new data and user interactions, adapting the integration processes to improve efficiency and accuracy. The Predictive Analytics Module within this layer can analyze the catalog data to provide insights and recommendations. For example, it can forecast demand for specific products, identify trends in vendor pricing, or recommend optimal inventory levels. These insights help users make informed decisions, enhancing the efficiency of product management and procurement processes.

Processed catalog data can be visualized in the Presentation Layer 350. This layer can provide a dynamic user interface that adapts to the specific requirements of different users, such as procurement managers, product specialists, and vendors. It offers customizable dashboards that display real-time data, insights, and actionable items tailored to user roles and preferences. Advanced data visualization tools convert complex datasets into graphical representations such as charts, graphs, and heat maps, making it easier for users to understand and act on the information.

Throughout the entire process, the Exception Management Layer 360 ensures data integrity and smooth operation by identifying and resolving data errors, system anomalies, and other issues in real-time. For instance, if a vendor catalog contains inconsistent pricing data, the exception management system flags the issue and prompts corrective action. This proactive approach maintains the accuracy and reliability of the integrated data, preventing disruptions and facilitating catalog management.

In these exemplary use cases, System 300 can provide both vendor and customer systems ensuring real-time data synchronization and maintaining up-to-date information across the platform. This scalable aggregation and standardization eliminates the need for separate solutions for different entities, significantly enhancing operational efficiency and reducing integration time and costs.

Figure 4:
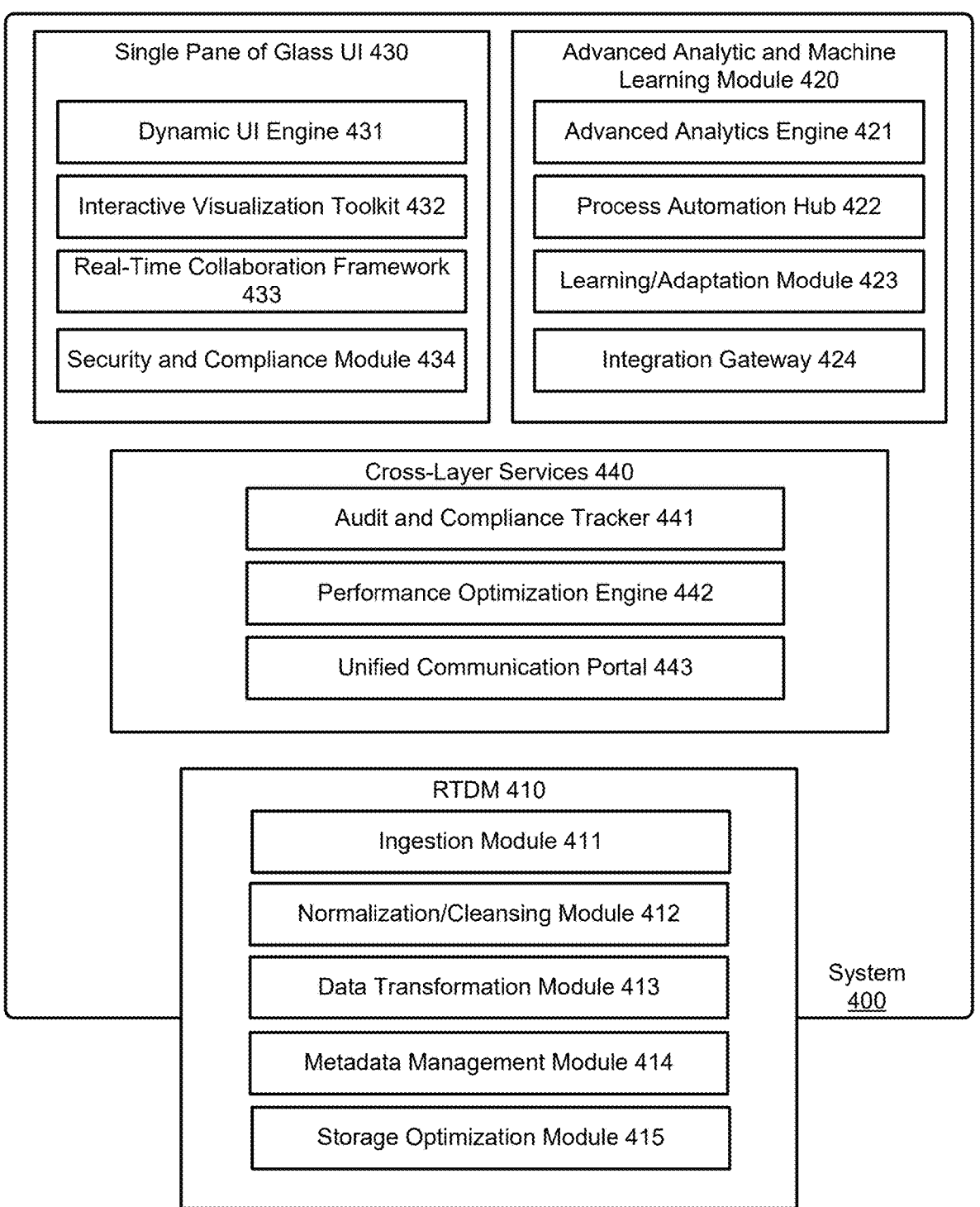
FIG. 4 is an illustration of a system configured as an advanced IT distribution platform to enhance data handling, processing, and presentation capabilities through integrated sub-components, according to some embodiments.

FIG. 4 illustrates System 400, an advanced configuration of an IT Distribution Platform designed to enhance data handling, processing, and presentation capabilities through integrated sub-components. In some embodiments, System 400 can include a Real Time Data Mesh (RTDM) 410, Advanced Analytic and Machine Learning (AAML) Module 420, Single Pain of Glass (SPoG) user interface (UI) 430, and Cross-Layer Services 440. The structure and capabilities of System 400 can be aligned with the real-time, AI-driven integration framework illustrated in FIG. 3, ensuring comprehensive and efficient integration processes.

RTDM 410 of System 400 can be configured as an AI-based vendor and customer agnostic framework to integrate legacy systems into a distribution platform, according to some embodiments. RTDM 410 can be configured to manage complex data workflows efficiently. This layer can include Ingestion Module 411, which can be configured to automate the data ingestion process from various sources such as IoT devices, cloud sources, and traditional databases. The Normalization and Cleansing Module 412 can be configured to employ advanced algorithms and machine learning models to clean and standardize incoming data, ensuring quality and consistency. Data Transformation Module 413 can be configured to support real-time data streaming transformations, facilitating immediate analytics and decision-making processes. Metadata Management Module 414 can be configured to manage metadata effectively, enhancing data governance and discoverability. Storage Optimization Module 415 can be configured to optimize data storage and retrieval, adjusting data storage methods and structures based on usage patterns and access frequencies. RTDM 410 can be an embodiment of Real-Time Data Ingestion Layer 310, capable of ingesting, aggregating and normalizing diverse data sources and formats in real-time.

RTDM 410 can be configured to dynamically ingest and adapt to data formats and workflows provided by customers and vendors without requiring any modifications to their existing systems. Ingestion Module 411 identifies the data structure and format used by the customer's legacy system and maps it into the platform's internal schema. The Normalization and Cleansing Module 412 ensures that any transformations are performed without altering the integrity of the customer's original data format, enabling bi-directional compatibility. This configuration allows customers to continue their operations without adjustment while ensuring compatibility with the platform's unified data handling processes.

AAML Module 420 of System 400 can be configured as the core analytical engine, where complex data processing and analysis can be performed. Advanced Analytics Engine 421 can be configured to execute complex data analyses, including predictive and prescriptive analytics, using cutting-edge artificial intelligence models. Process Automation Hub 422 can be configured to integrate complex workflows across various components and external systems, enhancing operational efficiency. Learning and Adaptation Module 423 can be configured with self-learning algorithms that adapt processing strategies based on new data insights and operational feedback. Integration Gateway 424 can be configured to facilitate data integration with external platforms, enabling System 400 to function within a larger ecosystem of business tools. This layer incorporates the AI and Analytics Layer 340 from FIG. 3, utilizing self-learning AI engines and predictive analytics to continuously improve integration processes and decision-making capabilities.

SPOG UI 430 of System 400 can be configured to provide dynamic and customizable user interaction capabilities. Dynamic User Interface Engine 431 can be configured to offer highly customizable interfaces tailored to user roles and individual preferences, enhancing user engagement. Interactive Visualization Toolkit 432 can be configured to include a broad range of data visualization options such as 3D modeling and predictive scenario visualization, allowing users to interact with data in innovative ways. Real-Time Collaboration Framework 433 can be configured to support enhanced collaborative tools, including virtual workspaces and real-time data manipulation, facilitating effective teamwork. Security and Compliance Module 434 can be configured to implement advanced security features such as biometric access controls and advanced encryption standards to ensure data integrity and compliance with global data protection regulations. SPOG UI 430 can be an embodiment of Presentation Layer 350 from FIG. 3, configured such that users have access to real-time, interactive, and secure data visualization and collaboration tools.

Cross-Layer Services 440 in System 400 can be configured to provide services that span across the data management, processing, and presentation layers. Audit and Compliance Tracker 441 can be configured to monitor and record all operations within the system to ensure compliance with internal and external regulations. Performance Optimization Engine 442 can be configured to dynamically adjust system resources and processing parameters to optimize performance across all layers. Unified Communication Portal 443 can be configured to integrate communication tools across the platform, enabling users to interact through voice, video, and text within the system environment. Cross-Layer Services 440 can be an embodiment of Exception Management Layer 360, and configured to identify and resolve data errors, system anomalies, and other issues in real-time, maintaining data integrity and reliability.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 5:
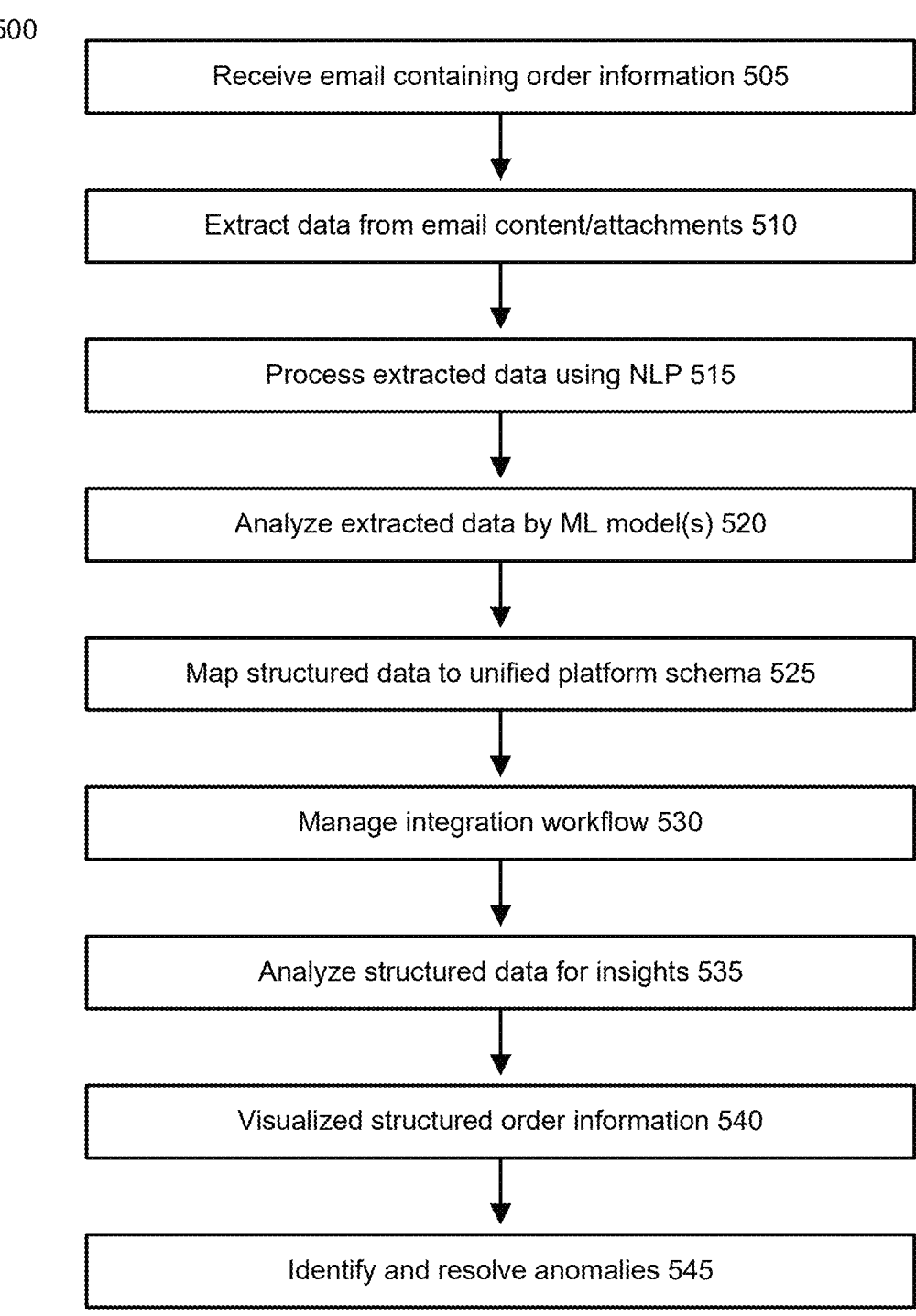
FIG. 5 is a flow diagram of a method for performing the conversion of email orders into structured data formats, according to some embodiments of the present disclosure.

FIG. 5 is a flow diagram of a method 500 for performing the conversion of email orders into structured data formats, according to some embodiments of the present disclosure. In some embodiments, method 500 provides operational steps to automate the extraction and processing of email data. In some embodiments, method 500 performs real-time data transformation and integration. Based on the disclosure herein, operations in method 500 can be performed in a different order and/or vary.

At operation 505, a computing device can receive an email containing order information. This email may include attachments such as PDFs or spreadsheets that contain additional order details.

At operation 510, the computing device can use the Real-Time Data Ingestion Layer 310 to extract data from the email content and attachments. This involves identifying relevant data fields such as order numbers, product descriptions, quantities, and customer information. The Data Ingestion Engine captures the email and its attachments in real-time, leveraging connectors and APIs that support multiple data formats and communication protocols.

At operation 515, the computing device can process the extracted data using the NLP module in the Data Transformation and Mapping Layer 320. The NLP module parses the email content, extracting structured information from unstructured text. This can include identifying key phrases and entities within the email body and attachments that pertain to order details.

At operation 520, the ML models in the Data Transformation and Mapping Layer 320 analyze historical data to identify patterns and relationships, facilitating accurate data mapping and transformation. These models use training data to improve their accuracy over time, learning from previous email orders to better predict and extract relevant data fields.

At operation 525, the Schema Mapping Engine within the Data Transformation and Mapping Layer 320 automatically maps the extracted data to the unified platform's schema, performing normalization, deduplication, and conversion tasks. This ensures that the data can be formatted correctly and consistently, ready for integration into the system.

At operation 530, the Workflow Orchestration Engine in the Integration and Orchestration Layer 330 can manage the integration workflow, ensuring that the transformed data can be efficiently aggregated into the order management system. The engine coordinates various tasks such as data validation, error handling, and system synchronization to maintain a smooth workflow.

At operation 535, the AI and Analytics Layer 340 can analyze the processed order data to provide predictive insights and recommendations. For instance, the Predictive Analytics Module may forecast inventory needs based on order trends, identify optimal shipping methods, or suggest adjustments to pricing strategies based on real-time data.

At operation 540, the processed order data can be visualized in the Presentation Layer 350, offering a customizable dashboard that displays real-time data, insights, and actionable items tailored to user roles and preferences. The dashboard can support interactive visualizations, enabling users to drill down into specific data points for detailed analysis.

At operation 545, the Exception Management Layer 360 identifies and resolves any data errors or anomalies during the process, ensuring data accuracy and reliability. This layer employs robust exception handling mechanisms, such as automated alerts and error logs, to quickly address and correct any issues that arise.

Figure 6:
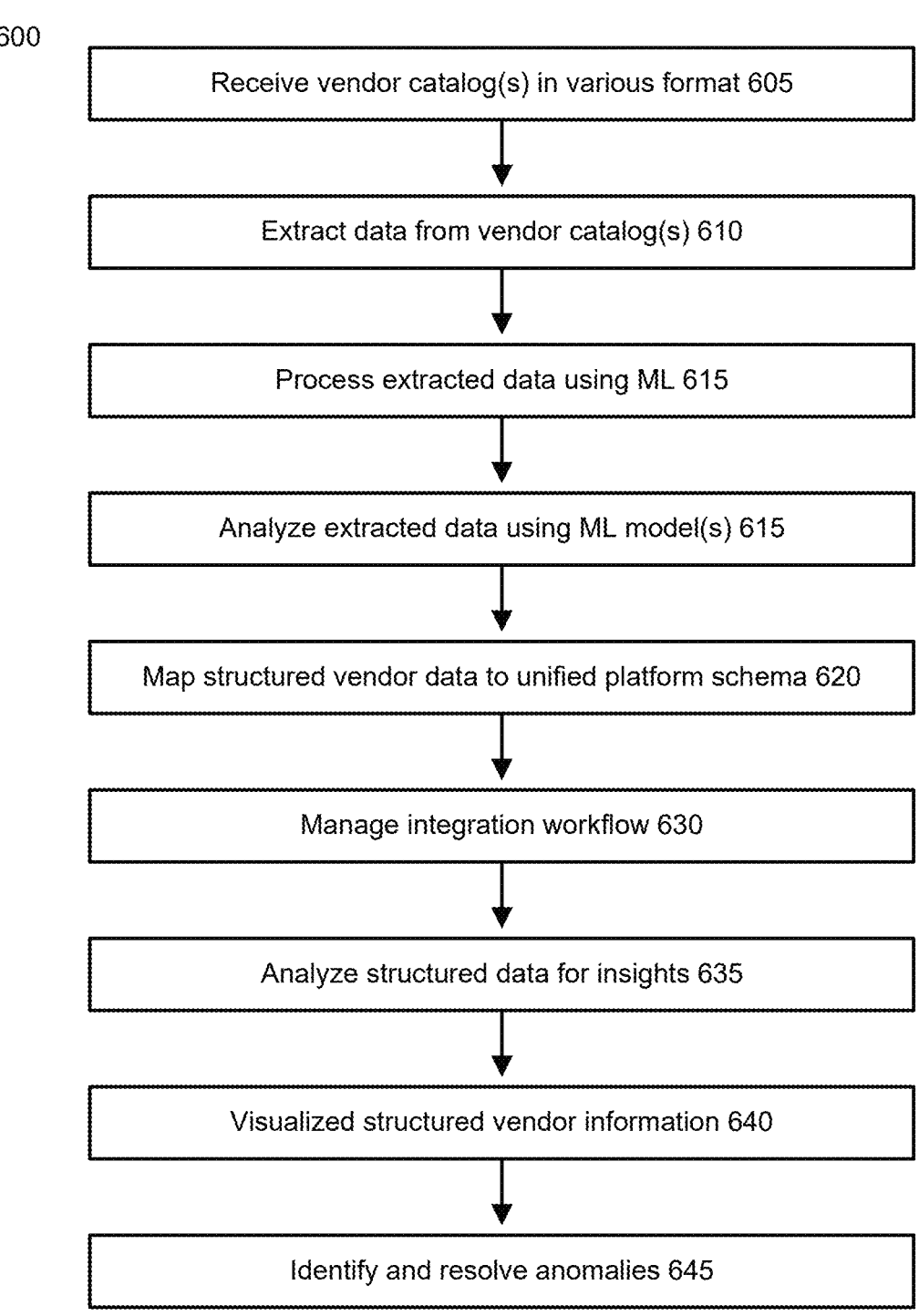
FIG. 6 is a flow diagram of a method for processing vendor catalogs, according to some embodiments of the present disclosure.

FIG. 6 is a flow diagram of a method 600 for processing vendor catalogs, according to some embodiments of the present disclosure. In some embodiments, method 600 provides operational steps to automate the extraction, transformation, and integration of catalog data. In some embodiments, method 600 performs real-time data transformation and integration of diverse vendor formats into a standardized platform format. Based on the disclosure herein, operations in method 600 can be performed in a different order and/or vary.

At operation 605, a computing device can receive vendor catalogs in various formats such as PDFs, spreadsheets, and documents. The computing device interfaces with various data sources through connectors and APIs, enabling it to capture data from multiple vendor systems and formats.

At operation 610, the computing device can use the Real-Time Data Ingestion Layer 310 to extract data from these catalogs. This involves utilizing data adapters and connectors capable of interfacing with diverse data formats and communication protocols. The Data Ingestion Engine initiates the extraction process by identifying and capturing relevant fields such as product descriptions, prices, stock levels, and vendor details. This extraction can be performed in real-time or batch mode, depending on the system's configuration and capabilities.

At operation 615, the NLP module in the Data Transformation and Mapping Layer 320 parses the catalog content to extract structured information from unstructured text. The NLP module employs techniques such as tokenization, stemming, and lemmatization to process textual data, extracting key information such as item names, specifications, and vendor notes from unstructured text in PDFs or documents.

At operation 620, the ML models in the Data Transformation and Mapping Layer 320 analyze historical data to identify patterns and relationships within the catalog data. These models facilitate accurate data mapping and transformation by recognizing patterns in product descriptions, pricing structures, and stock levels, enabling the system to predict and automate the mapping of new catalog data based on learned patterns.

At operation 625, the Schema Mapping Engine within the Data Transformation and Mapping Layer 320 automatically maps the extracted catalog data to the unified platform's schema. This process can include performing normalization to ensure consistency in data formats, deduplication to remove redundant entries, and conversion tasks to align the data with the platform's standardized structure. The Schema Mapping Engine uses predefined rules and learned patterns to accurately map data fields from the vendor catalogs to the platform schema.

At operation 630, the Workflow Orchestration Engine in the Integration and Orchestration Layer 330 can manage the integration workflow. This involves coordinating various tasks and processes required for integrating the transformed catalog data into the product management system. The Workflow Orchestration Engine ensures that data validation, error handling, and system synchronization tasks can be executed in a sequential and efficient manner, facilitating data flow into the product management system.

At operation 635, the AI and Analytics Layer 340 can analyze the processed catalog data to provide predictive insights and recommendations. The Self-Learning AI Engine within this layer continuously learns from new data and user interactions, improving the integration processes over time. The Predictive Analytics Module can forecast product demand based on historical sales data, identify vendor pricing trends, and recommend optimal inventory levels, helping users make informed procurement and inventory management decisions.

At operation 640, the processed catalog data can be visualized in the Presentation Layer 350. This layer offers a customizable dashboard that displays real-time data, insights, and actionable items tailored to user roles and preferences. Advanced data visualization tools convert complex datasets into graphical representations such as charts, graphs, and heat maps, making it easier for users to understand and act on the information. The Single Pane of Glass (SPoG) user interface ensures a consistent and intuitive user experience across multiple devices.

At operation 645, the Exception Management Layer 360 identifies and resolves any data errors or anomalies during the process. This layer can include robust exception management capabilities that proactively flag data inconsistencies, system anomalies, and other issues, prompting corrective actions to maintain data integrity and reliability. The Exception Management Layer ensures that any errors in the vendor catalog data can be addressed promptly, preventing disruptions in the workflow and ensuring smooth operation.

Figure 7:
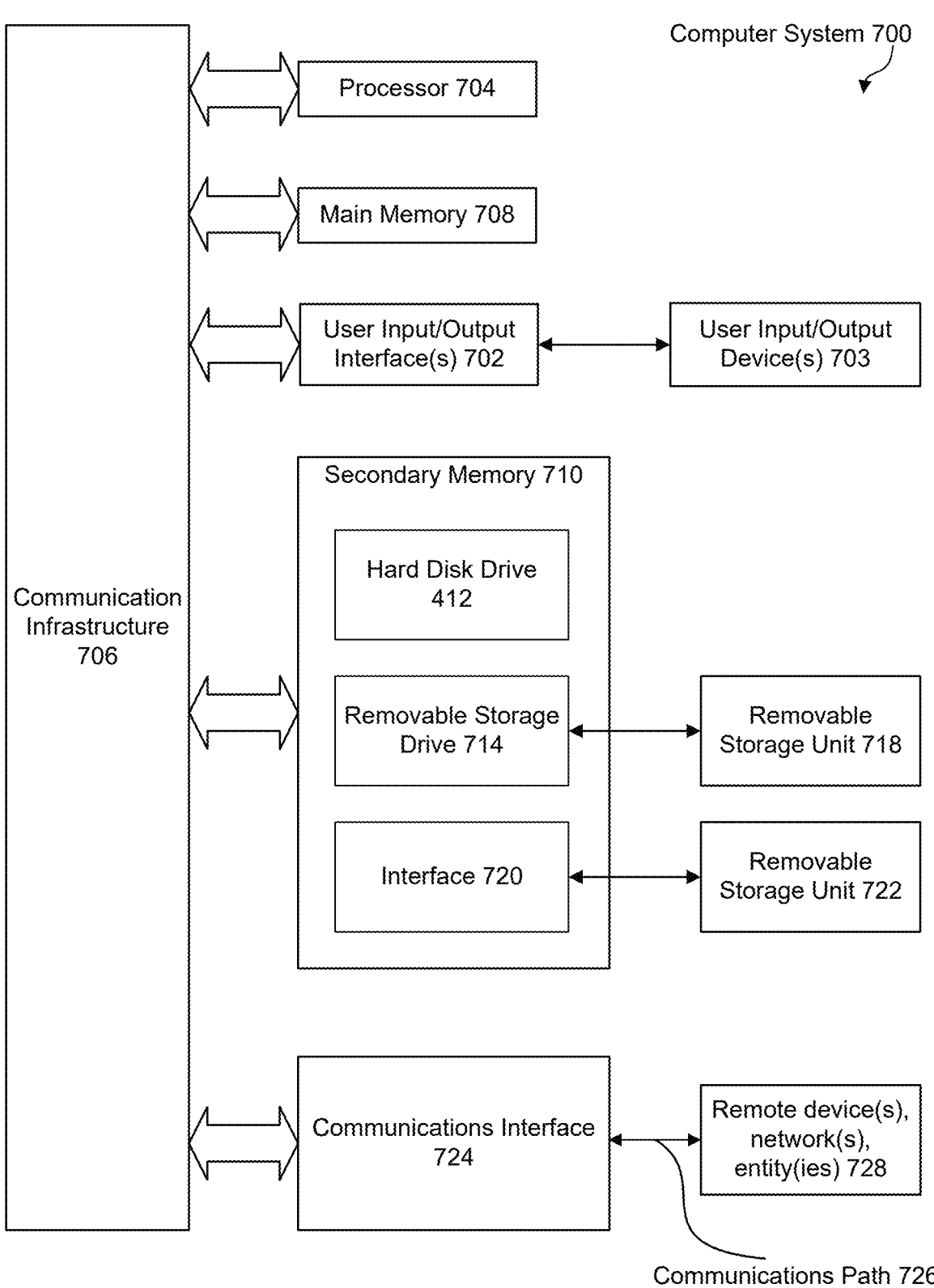
FIG. 7 is a block diagram of the example components of a device, illustrating the processor, memory, and communication interfaces used to implement the system, according to some embodiments.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718. Removable storage unit 718 may include a computer-usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This can include, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for integrating legacy systems into a unified platform, comprising:

a server, coupled to a processor, and configured to execute instructions that:

ingest, normalize, and store data, by a data layer, from multiple sources;

analyze and transform data using AI algorithms, by a processing layer, wherein the processing layer comprises a self-learning generative AI engine configured to automatically identify, without predefined mappings, a schema of a legacy system by applying (a) natural language processing to extract relevant information from a plurality of data fields comprising one or more of customer notes, communications, and documents, and (b) at least one machine learning process to historical structured data to detect patterns and relationships within the data fields, wherein the generative AI engine employs a schema mapping engine to transform data from the legacy system into a canonical schema of the unified platform through normalization, deduplication, and conversion tasks, and wherein the generative AI engine preserves the original schema for bidirectional interoperability to enable the legacy system to continue operating in its native format without modification; and present a dynamic user interface for data visualization and interaction, by a presentation layer;

wherein the processing layer comprises an AI and analytics module featuring a self-learning AI engine that continuously adapts integration processes based on new data and user interactions.

2. The system of claim 1, wherein the data layer comprises connectors and APIs to facilitate data extraction from legacy systems such as ERP, CRM, and CPQ, supporting multiple data formats and communication protocols.

3. The system of claim 1, wherein the data layer comprises preprocessing units that clean and standardize data, employing techniques such as tokenization, stemming, lemmatization, scaling, and transformation.

4. The system of claim 1, wherein the processing layer comprises a workflow orchestration engine that manages integration workflows facilitating data flow between legacy systems and the unified platform.

5. The system of claim 1, wherein the presentation layer comprises customizable dashboards that provide real-time data insights and interactive visualizations such as charts, graphs, and heat maps.

6. The system of claim 1, wherein the presentation layer comprises security features such as role-based access controls, secure login mechanisms, and data encryption both in transit and at rest.

* * * * *